United States Patent [19]
Hutton

[11] Patent Number: 5,305,872
[45] Date of Patent: Apr. 26, 1994

[54] CHAIN

[75] Inventor: Richard W. Hutton, Portland, Oreg.

[73] Assignee: ESCO Corporation, Portland, Oreg.

[21] Appl. No.: 827,217

[22] Filed: Jan. 30, 1992

[51] Int. Cl.[5] .............................................. B65G 17/38
[52] U.S. Cl. .................................... 198/853; 198/851
[58] Field of Search ............... 198/728, 730, 731, 851, 198/853; 474/202, 212, 218, 232, 233

[56] References Cited

U.S. PATENT DOCUMENTS

| | | | |
|---|---|---|---|
| 1,626,396 | 4/1927 | Drake | 198/851 X |
| 1,690,838 | 11/1928 | Rorabeck | 198/851 |
| 1,748,334 | 2/1930 | Evans | 198/731 |
| 1,793,783 | 2/1931 | Drake et al. | 198/851 X |
| 1,937,304 | 11/1933 | Worrall | 198/851 X |
| 2,059,063 | 10/1936 | Tourville | 198/851 X |
| 3,881,593 | 5/1975 | Mushovic et al. | 198/853 |
| 4,276,040 | 6/1981 | Petershack | 198/853 X |
| 4,950,398 | 8/1990 | Wiegard et al. | 198/731 X |
| 5,121,831 | 6/1992 | Fesler | 198/853 |

FOREIGN PATENT DOCUMENTS

| | | | |
|---|---|---|---|
| 0949098 | 9/1956 | Fed. Rep. of Germany | 198/731 |
| 1807180 | 6/1969 | Fed. Rep. of Germany | 198/851 |

*Primary Examiner*—D. Glenn Dayoan
*Assistant Examiner*—James R. Bidwell
*Attorney, Agent, or Firm*—Banner, Birch, McKie & Beckett

[57] ABSTRACT

A chain for use primarily in conveyor systems includes a plurality of male and female links pivotally coupled together. The female link includes a generally I-shaped body segment and a pair of bifurcated arms at each end. The arms are asymmetrically formed so that one arm defines a stop for preventing turning of the pivot pin and the other arm defines an enlarged boss. The provision of the flanges along the body segment and the boss at the ends function to increase the bearing surface at points of greatest wear to thereby increase the useful life of the links. The provision of the boss further obviates the need for spacers heretofore required in such chains of the prior art.

20 Claims, 6 Drawing Sheets

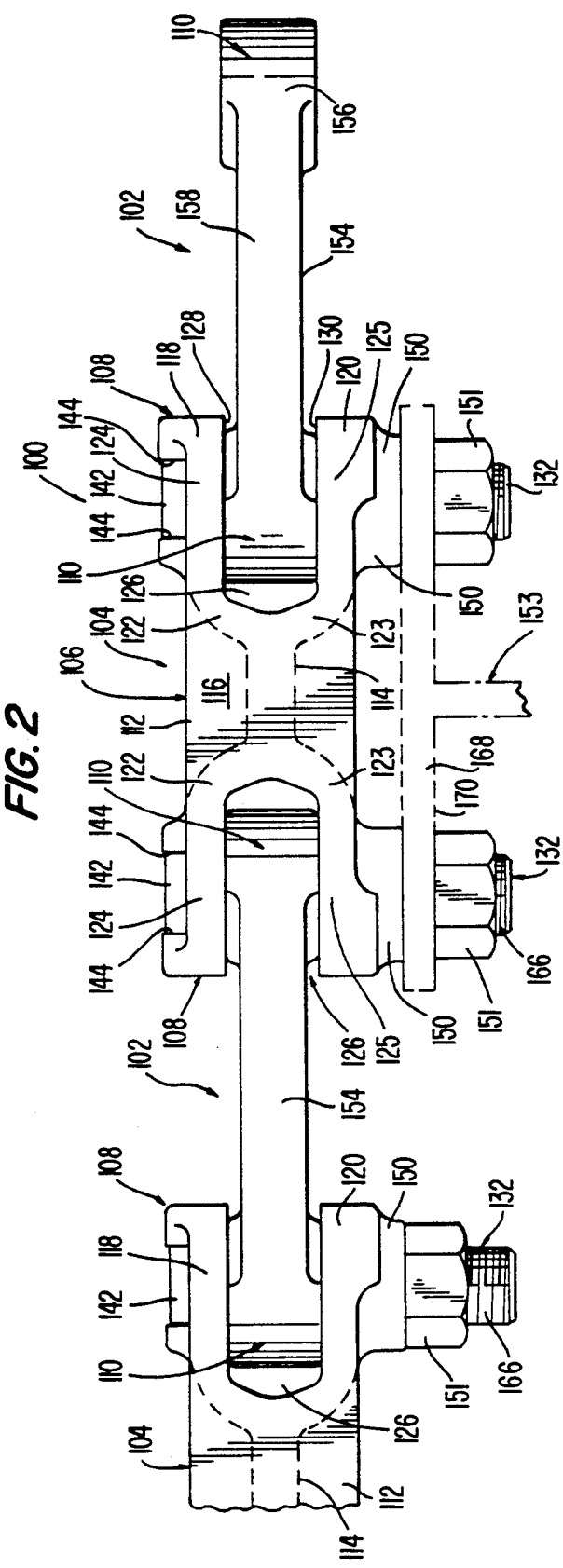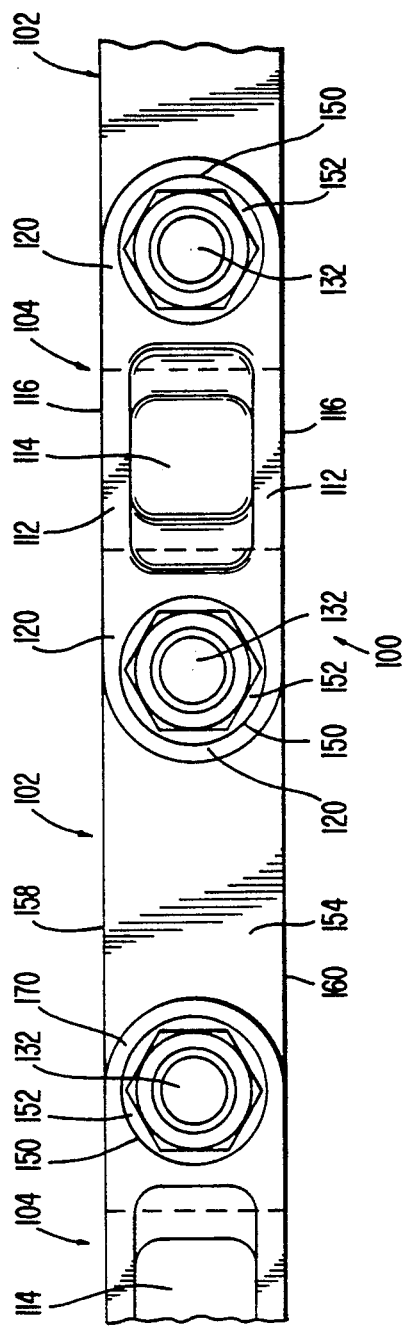

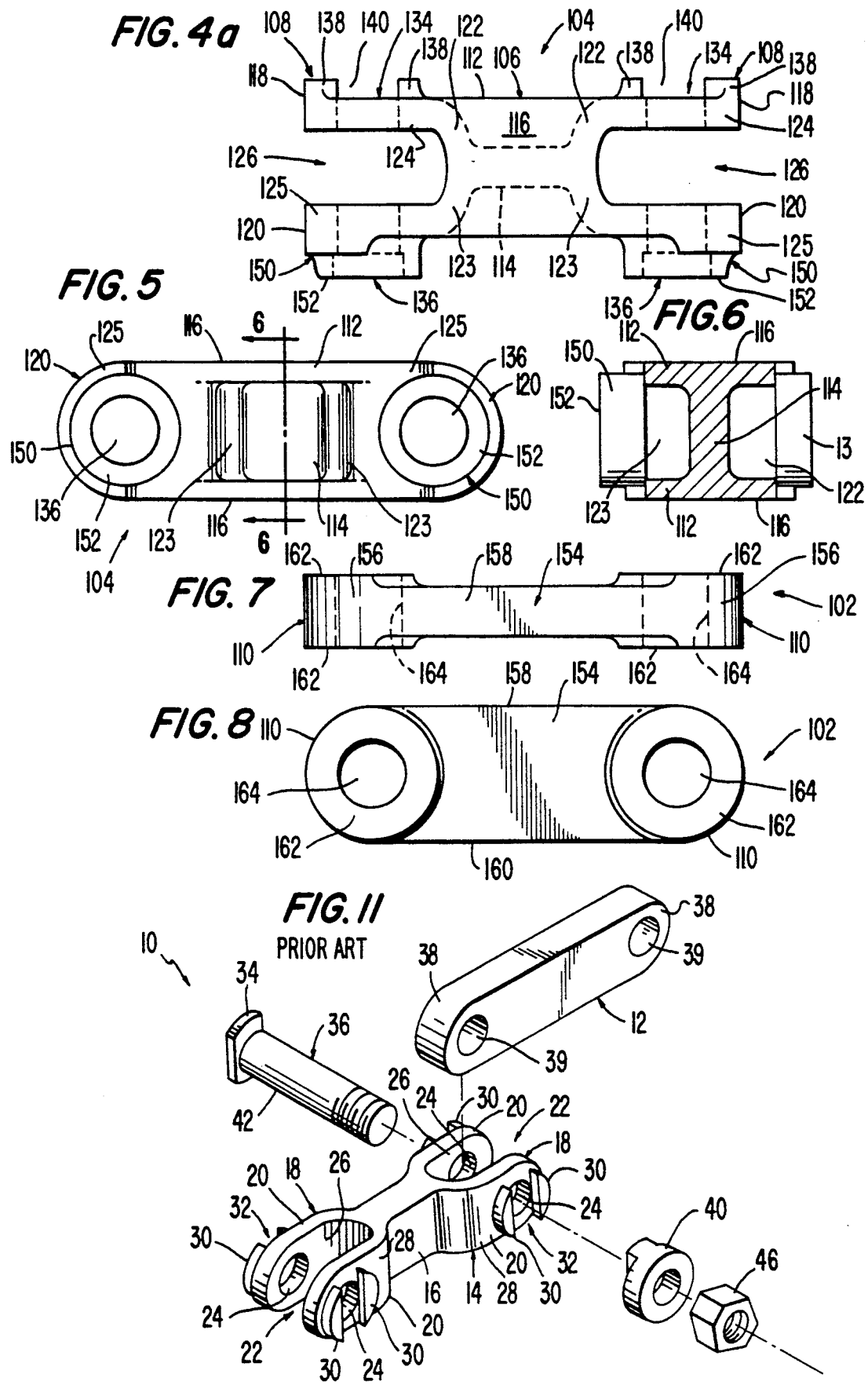

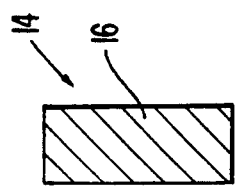
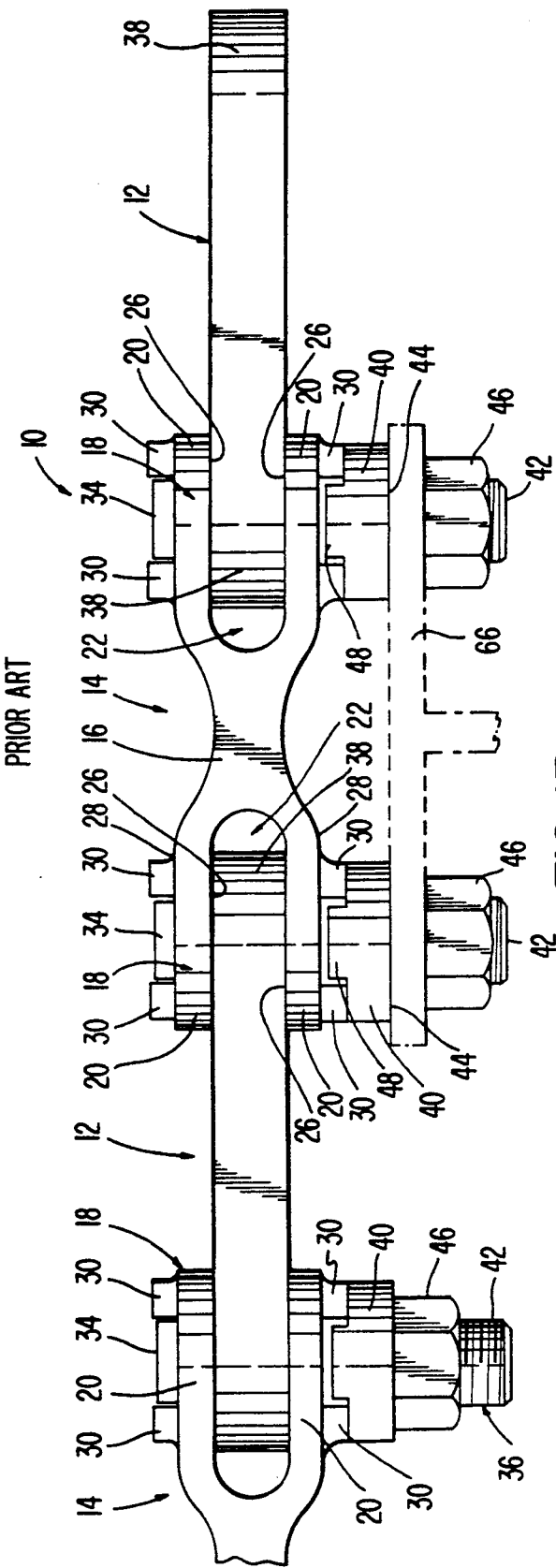
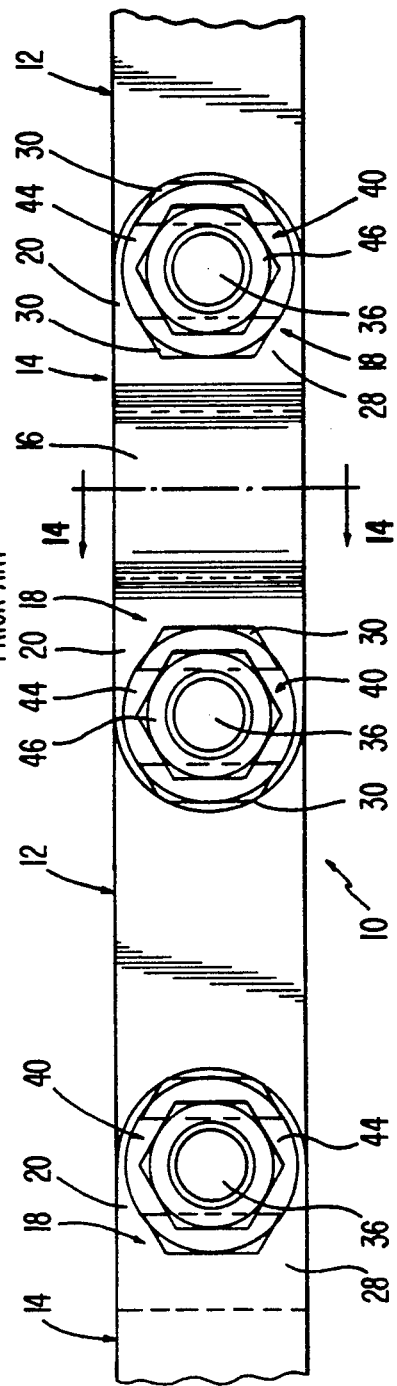

CHAIN

FIELD OF THE INVENTION

The present invention pertains to a chain, and in particular to a chain for use in a conveyor system.

BACKGROUND OF THE INVENTION

Conveyor chains 10 (FIGS. 11-14) are ordinarily fabricated of male and female links 12, 14 pivotally interconnected to form a flexible but sturdy construction. These chains are generally attached to transport elements, such as flights (FIG. 15), to transport products in a manufacturing process. In use the chains are wrapped about a plurality of sprockets, at least one of which is driven, and passed along a prescribed circuit.

The female link 14 (FIGS. 11-14) is typically formed as a unitary cast or fabricated member having a central bar segment 16 and a pair of bifurcated ends 18. The bar segment has a rectangular cross-sectional shape. Each end 18 forms a pair of arms 20 which are spaced apart to define a gap 22 therebetween. Each of the arms 20 further defines a transverse bore 24, such that the bores 24 of opposed arms are aligned with one another. The inner sides 26 of the arms generally have a planar shape for matingly receiving a male link 12. The outer sides 28 are each provided with a pair of spaced apart stops 30. The stops are positioned to each side of bore 24 to form an elongated channel 32 therebetween which intersects the bore. The channels 32 are provided to receive and retain a T-head 34 of a bolt 36 to prevent the bolt's rotation. Stops 30 are provided on the outer side of each arm 20 so that female links 14 may be assembled into the chain without concern for their particular orientation.

Male link 12 (FIGS. 11-14) is also typically formed as a unitary cast or fabricated member. The male link has a generally rectangular parallelepiped shape across its entire length. The width of link 12 is substantially equal to the size of gap 22 so that the link may be matingly received within the gap. Specifically, the ends 38 of male links 12 are received for free pivotal movement in gaps 22 of adjacent female links 14 to enable the chain to possess the requisite flexibility. Each end 38 further defines a transverse bore 39 which is aligned with a pair of the opposed bores 24 in female link 14. The shank 42 of bolt 36 is passed through the aligned bores 24, 39 to pivotally couple links 12 and 14 together. However, in view of the large stresses placed on the chain, the bores are often subject to premature wearing and failure.

In the assembled chain, bolts 36 are positioned through bores 24, 39 such that T-head 34 is matingly received within channel 32. A spacer 40 is passed over the free end of threaded shank 42 in order to provide a flat surface 44 of ample size for nut 46 to abut. More specifically, spacer 40 is a cylindrical disk member which includes a pair of shoulders 48. The shoulders are adapted to be matingly received in the outer portions of channel 32 and thereby function to stabilize and support the spacer.

As an example, conveyor chains 10 have been used in low-flow baths 50 to separate refuse 52 from coal 54 to upgrade the quality of the coal (FIG. 10). In general, bath 50 includes a tank 56 partially filled with a fluid media 58, such as water mixed with a finely ground magnetite. The concentration of the magnetite is selected so that when the raw coal is deposited in the tank, the coal floats but the refuse sinks. A conveyor chain 10 is employed to separately remove both the coal and refuse from the tank.

In this environment, elongate flights 60 are secured between a pair of parallel chains 10 (FIGS. 12 and 15). A flight 60 is comprised of an elongated body 62 provided with an orthogonal foot 64 at each end. The body 62 is a thin member having a relatively wide working face 65. Feet 64 ordinarily extend outward from body 62 to define the flight in a generally I-shaped configuration. Each foot 64 defines a pair of spaced apart holes 66, which are adapted to be received over the free ends of adjacent bolts 36. In this construction, feet 64 of flights 60 are sandwiched between spacers 40 and nuts 46. Body 62 spans the space between the two chains 10 such that the working face 65 is placed upright (i.e., perpendicular to the direction of chain travel).

In the operation of bath 50, the raw coal is dumped into the tank via feed chute 78 (FIG. 10). Once in the fluid media, the raw coal separates (because of the different specific gravities of the materials) such that the coal floats on the surface 79 of media 58 while the refuse sinks to the bottom 80 of the tank. The floating coal is skimmed out of the tank by flights 60 passing along the upper path 81 of the chain circuit. The flights drive the coal up out of the fluid media along ramp 82, over the end of the tank and into clean coal chute 84. Similarly, flights 60 pass along the lower path 85 of the circuit at the bottom 80 of the tank to push the refuse toward sprocket 68a. At the end of the tank, the refuse is dropped into the refuse chute 86 as the chains rotate around sprocket 68a.

The chains 10 in bath 50 (FIG. 10) are passed along a defined path which extends around sprockets 68a, 68b, at least one of which is driven by a motor (not shown). In between the sprockets 68a, 68b, the chains are received into slots 70 defined by wear and guide rails 74a, 74b attached to the sides 72 of tank 56 (FIG. 15). Rails 74a, 74b define opposed engagement faces 76a, 76b to form the slots 70. The slots cause the chains to follow a non-linear path designed to remove the refuse and coal from the tank. Due to the weight of the chains 10 and flights 60, the lower sides of links 12, 14 generally slide along face 76b of the lower wear rail 74b. As to be expected, this sliding causes links 12, 14 to be quickly worn away.

SUMMARY OF THE INVENTION

The present invention pertains to a conveyor chain comprised of uniquely structured links designed to enhance the durability and longevity of the chain. In particular, the links are cooperatively shaped to provide increased bearing areas at points of greatest wear.

The female link of the present invention is formed with a pair of spaced apart wear flanges along its midsection to provide an increased bearing surface for engagement with the wear rails forming the conveyor path. The increased area causes the link's bearing surface to experience less pressure as it is moved along the wear rail. The reduced pressure results in less wearing of the link and in turn a longer useable life. Moreover, while the addition of the flanges results in a substantial lengthening of the chain's useable life, they account for only a small addition to the chain's overall weight.

In addition, the bifurcated ends of the female links are formed to increase the pin-hole bearing area. Specifically, the arms of each end are widened to provide a substantially lengthened bore for receiving the coupling pin. In the preferred construction, the arms are asymmetrically formed such that one arm is provided with stops to receive the T-head of a coupling bolt, and the other arm is formed with an enlarged boss to provide a substantially lengthened bore. The lengthened bore provides an increased bearing area between the links and the shank of the bolt and, in turn, a longer usable life for the chain.

The female link further includes a boss portion which defines a flat, annular outer wall. The outer wall forms a suitable surface against which the flight or nuts can abut. As a result, the need for spacers is eliminated. The present invention thus enables the construction of a chain with fewer parts.

The male links are also constructed to increase the pin-hole bearing area, but without a concomitant increase in the link's weight. In particular, the link is formed with enlarged ends to thereby provide a bore with a greater length than is known in the prior art. The increased surface area receiving the coupling bolt reduces the wearing of the bores and thereby increases the chain's useable life. The width of the central portion, however, is not enlarged. Hence, while the enlarged heads of the male links substantially increase the useable life of the chain, the weight of the link is not significantly increased.

A chain constructed with the broad wear flanges of the female links in accordance with the present invention has an increased wear bearing area, which in a preferred construction is on the order of about 69% over the prior art constructions. Further, the increased lengths of the coupling bores in the male and female links increases the pin-hole bearing area, which in a preferred construction is increased by about 38% and 44%, respectively, over the prior art chains. Moreover, even greater percentages of improvements may be possible with variations within the scope of the invention and with links of different sizes.

These substantial increases in the bearing areas of the present chain results in the usable chain life being more than doubled as compared to prior art chains. Yet, despite this dramatic increase in the chain's useable life, the overall weight of the chain is only slightly increased. For example, the weight of the preferred construction of the chain is increased only about 13% as compared to the inferior chains of the prior art. The low weight of the chain avoids substantial increases in the amount of material required for fabrication of the chain and in the force required to drive the chain along the prescribed circuit. The low weight of the chain also avoids a substantial increase in the pressure to be applied to the increased bearing surfaces. Finally, the improved construction provides greater resistance to twisting during loading in an open conveyor area and bending while the chain travels over the sprockets or drums.

These and other objects, advantages and features of the present invention will be more fully understood and appreciated by reference to the written specification and appended drawings.

BRIEF DESCRIPTION OF THE DRAWINGS

FIG. 2 is a top plan view of a portion of a chain in accordance with the present invention.

FIG. 3 is a side elevational view of a part of the present chain.

FIG. 4a is a top plan view of a female link of the present chain.

FIG. 5 is a side elevational view of a female link of the present chain.

FIG. 6 is a cross-sectional view taken along line 6—6 in FIG. 5.

FIG. 7 is top plan view of a male link of the present chain.

FIG. 8 is a side elevational view of a male link of the present chain.

FIG. 11 is an exploded perspective of a coupled male and female link of a prior art chain.

FIG. 12 is a top plan view of the prior art chain.

FIG. 13 is a side elevational view of the prior art chain.

FIG. 14 is a cross-sectional view taken along line 14—14 in FIG. 13.

DETAILED DESCRIPTION OF THE PREFERRED EMBODIMENTS

A chain 100 in accordance with the present invention includes male link 102 and female link 104 which are pivotally interconnected to form a sturdy, but flexible construction (FIGS. 1-3, 4a, 4b and 5-9). The chain is primarily designed for use in conveyor systems, such as are used in low-flow bath systems. Nevertheless, the chains can be used in other environments as well.

Figure 1:
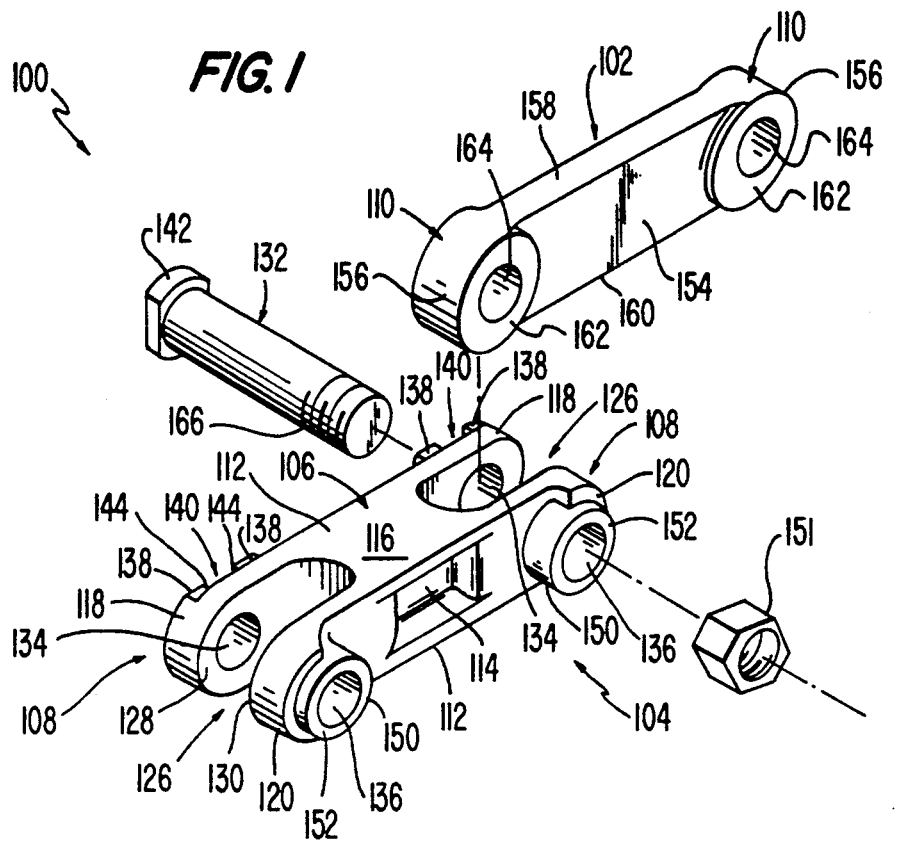
FIG. 1 is an exploded perspective view of a coupled male and female link according to the present invention.
Figure 10:
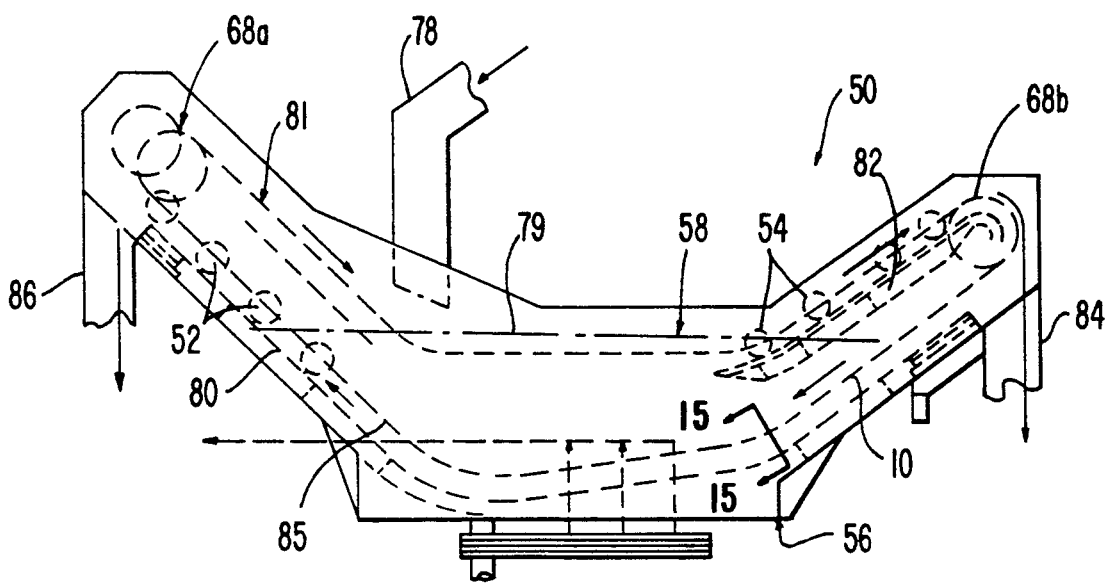
FIG. 10 is a side view of a prior art low-flow bath.
Figure 15:
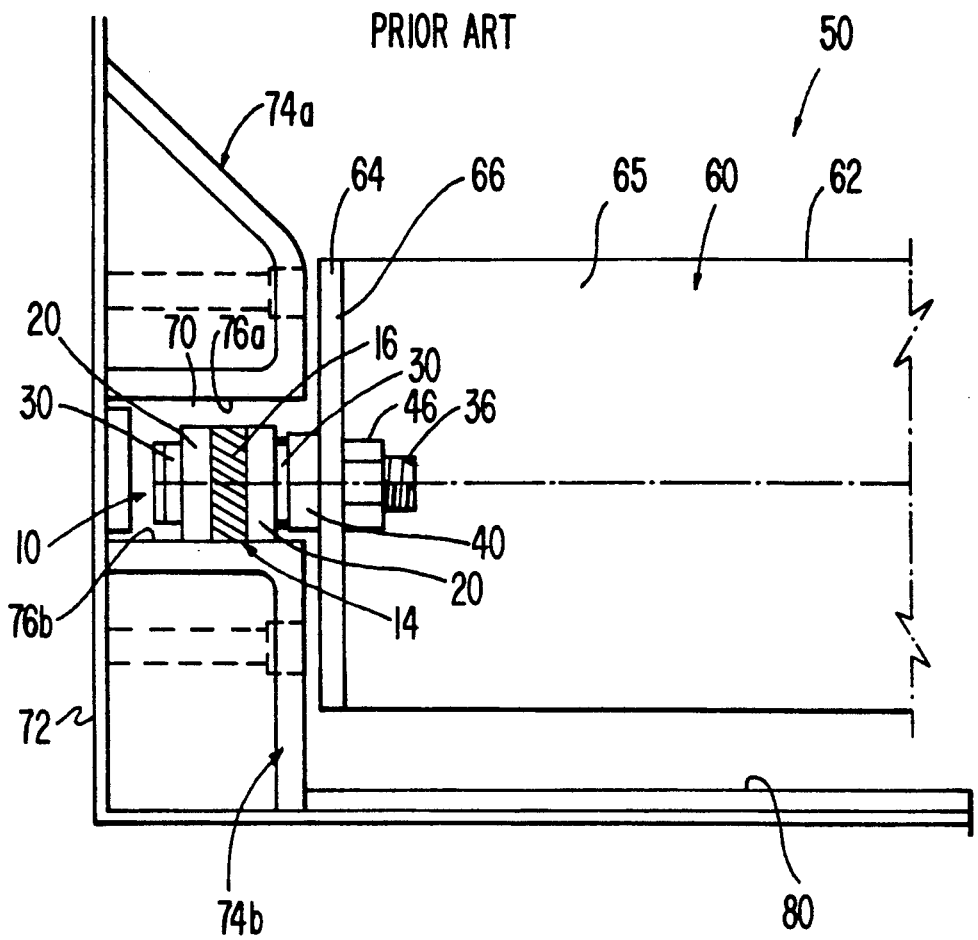
FIG. 15 is a partial cross-sectional view taken along line 15—15 in FIG. 10.

In general, female link 104 is comprised of a central portion 106 and a pair of bifurcated ends 108. Each of the bifurcated ends 108 defines a gap which receives and pivotally couples an end 110 of a male link 102 in a clevis type arrangement (FIGS. 1 and 2). In this way, the links are alternated with each other to form the chain.

Figure 9:
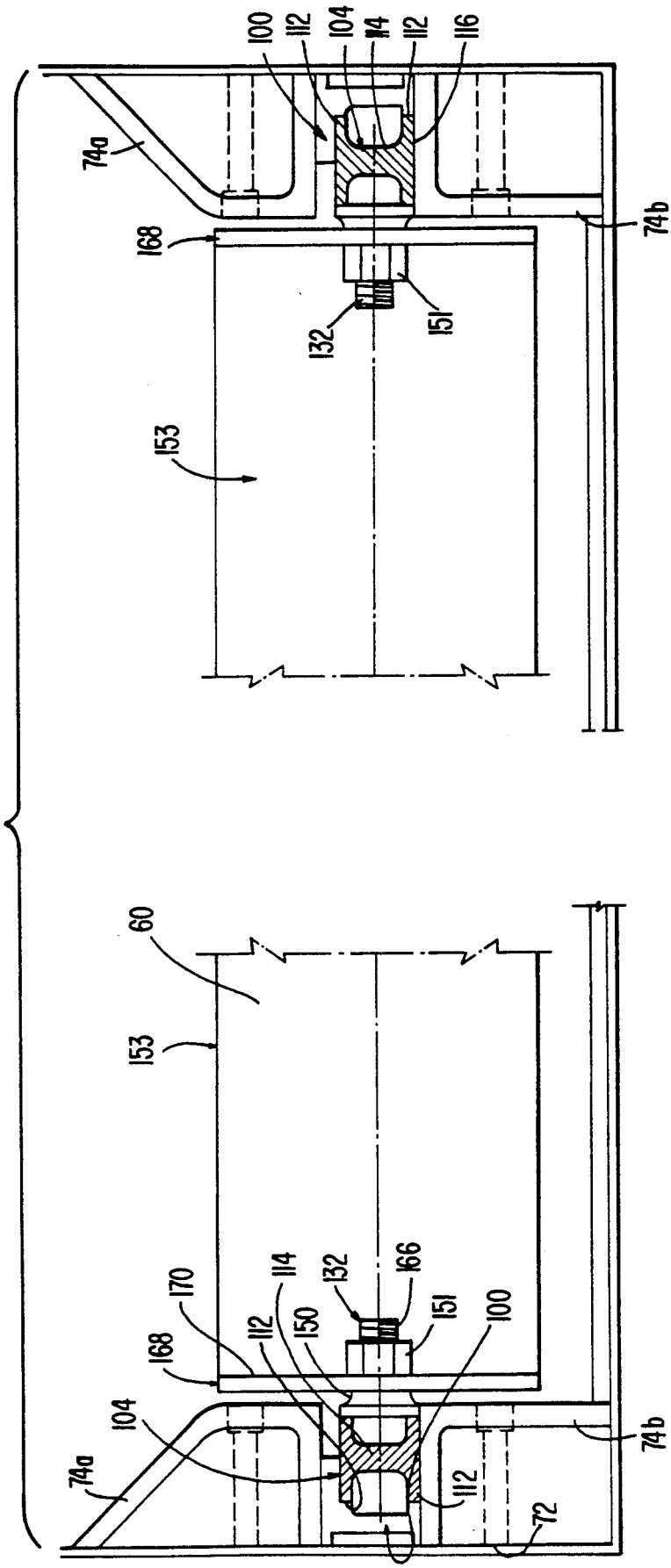
FIG. 9 is a cross-sectional view of a pair of the present chains supporting a flight in a bath.

More specifically, female link 104 (FIGS. 1-3, 4a and 5-6) is comprised of a central portion 106 formed with a substantially I-shaped configuration. Central portion 106 includes a pair of opposed outer flanges 112 and an interconnecting web 114. Each flange 112 defines a broad outer bearing face 116 which is adapted to engage and slide along the wear rails defining a conveyor circuit (FIG. 9). Flanges 112 preferably have the same width as the bifurcated arms; although other widths could be used. The size of the bearing face 116 in one of the preferred constructions is about 69% larger than the bearing faces of the prior art female links.

Figure 4B:
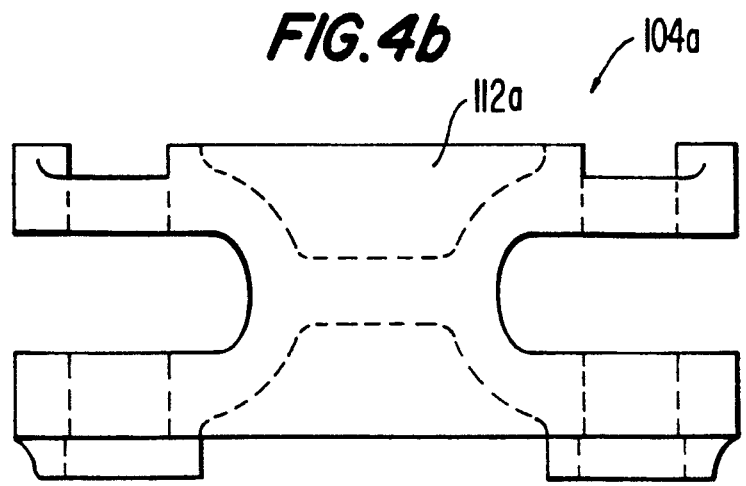
FIG. 4b is a top plan view of an alternative embodiment of a female link of the present chain.

In an alternative embodiment, the flanges 112a of female link 104a may extend beyond the width of the arms. This construction provides a substantially increased bearing area with a very small increase in the chain's weight. In a preferred construction, the female link of this embodiment (FIG. 4b) provides an additional 3.4 sq. inches of bearing area to each of the flanges as compared to the preferred embodiment (FIG. 4a). Yet despite such a dramatic increase in bearing area, the construction only adds about 0.6 pounds to the weight of the link. This construction increases the bearing surfaces by about 120% over the prior art chains.

Bifurcated ends 108 are each defined by a pair of arms 118, 120 (FIGS. 1-2 and 4a). Each arm 118, 120 includes connecting segments 122, 123 and end segments 124, 125. Connecting segments 122 interconnect end segments 124 with central portion 106. Likewise, connecting segments 123 interconnect end segments 125 with central portion 106. Connecting segments 122, 123 diverge relative to one another from one end of web 114. End segments 124, 125 extend longitudinally in a generally parallel relationship to each other. Arms 118, 120 thus form a generally Y-shaped configuration with the web 114 of central portion 106.

Arms 118, 120 of each end 108 are spaced apart from one another to define a gap 126 therebetween. Gap 126, between end segments 124, 125, has a width which matingly receives therein an end 110 of male link 102. Inner faces 128, 130 of end segments 124, 125 have planar configurations to permit a free swinging movement between the links. Each arm further defines a transverse bore 134, 136 through the end segment 124, 125 of each arm 118, 120 to facilitate the passage of a pivot pin 132. Bores 134, 136 are preferably formed with the same diameter and in alignment with each other.

Arm 118 further defines a pair of stops 138 on its outer side. Stops 138 are located on opposite sides of bore 134 to define a channel 140 therebetween. Channel 140 is preferably at least as wide as bore 134 to receive a T-head 142 of pivot pin 132 therein. Stops 138 define planar abutment faces 144 which are opposed to one another to form the sides of channel 140. When pin 132 is inserted into bores 134, 136, T-head 142 is matingly received within channel 140. In this construction, the sides 148 of head 142 abut faces 144 of stops 138 to prevent rotation of the pin 132. In the preferred construction, arm 118 and stops 138 have a width which is about 12% larger than those of the prior art.

Arm 120 defines an enlarged boss section 150 on its outer side. Boss section 150 projects laterally a substantially greater distance from gap 126 as compared to the extension of arm 118. This increase in the size of arm 120 provides for a substantially increased length of bore 136 relative to the female links of the prior art. This increased distance provides a larger bearing area for which to engage pin 132. As discussed above, the larger bearing area results in the application of less pressure on the bearing surface and thus less wear on the female link 104 and pin 132. The outer end 152 of boss 150 defines an annular planar surface against which nut 151, flight 153 or other transport element is adapted to abut in operation (FIGS. 1-2 and 9). As a result, the provision of bosses 150 also enables the spacers of the prior art to be eliminated.

Male link 102 (FIGS. 1-3 and 7-8) is a generally linear member comprised of an elongate, narrow central bar segment 154 and a pair of enlarged heads 156. Bar segment 154 has a generally rectangular cross-section; although other shapes could be used. Upper and lower faces 158, 160 of the link are preferably flat and adapted to slide along wear and guide rails defining a conveyor circuit, such as at 76b. Each head 156 has a width which is larger than the width of bar segment 154 and substantially equals the width of gap 126 in female link 104. The outer sides 162 of head 156 are generally planar surfaces which oppose inner faces 128, 130 of arms 118, 120. Head 156 is preferably fit within gap 126 to facilitate free pivoting of the links relative to one another. Head 156 further defines a bore 164 formed with substantially the same diameter and in alignment with bores 134, 136 in arms 118, 120. The provision of enlarged head 156 causes bore 164 to be lengthened as compared to the prior art links. Accordingly, bore 164 provides a larger bearing surface to engage the pivot pin. The larger area results in less wear and a longer usable life for the male link and coupling pin.

In forming chain 10, head 156 of male link 102 is inserted into a gap 126 of female link 104 so that bore 164 is aligned with bores 134, 136 (FIGS. 1-3). Pivot pin 132 is preferably formed as a bolt with a T-head 142 and threaded shank 166. Nevertheless, a pin with a non-threaded shank could also be used. In such cases, the nut could be replaced by a washer member welded to the shank, a keeper pin passed transversely through the shank (with or without an accompanying washer), or other types of securing means. Pin 132 is inserted into aligned bores 134, 136, 164 such that head 142 is received in channel 140. If no flight 153 or other transport element is to be attached, a nut 151 is threaded onto the free end of shank 166 and tightened against surface 152 of boss 150 (FIGS. 1 and 2). If a flight 153 is attached (FIGS. 2 and 9), the foot 168 is placed over the free end of shank 166 and against boss 150. Nuts 151 is then threaded onto pins 132 and tightened against the inner wall 170 of foot 168.

The above-discussed embodiments are merely preferred embodiments of the present invention. Other embodiments as well as many changes and alterations may be made without departing from the spirit and broader aspects of the invention.

I claim:

1. A conveyor chain comprising:
   a plurality of male links each having a pair of ends, each of said ends defining an aperture therein;
   a plurality of female links each having a central segment and a pair of ends, each of said ends defining a gap to receive an end of a male link and at least one aperture, said central segment having a generally I-shaped cross section including a pair of relatively broad wear flange portions adapted to slide along wear rails during use and for increasing the wear life of the chain by providing a broad contact surface between said female links and the wear rail upon which said female links slide; and
   a plurality of pivot pins, one of said pivot pins being inserted into said apertures of each said male and female link to be pivotally coupled together.

2. A conveyor chain in accordance with claim 1 wherein each end of each said female links includes a pair of bifurcated arms which define said gap.

3. A conveyor chain in accordance with claim 2 wherein said arms at each end of said female links are formed asymmetrically with respect to one another.

4. A conveyor chain in accordance with claim 2 wherein one of said arms of each end of said female links includes an enlarged boss portion which defines a substantially continuous annular end surface.

5. A conveyor chain in accordance with claim 4 wherein the other of said arms of each end of said female links includes at least one stop adapted to engage and prevent rotation of said pivot pin.

6. A conveyor chain comprising:
   a plurality of male links each having a pair of ends, each of said ends defining an aperture therein;
   a plurality of female links each having a central segment and a pair of ends, each of said ends including a pair of bifurcated arms defining a gap to receive an end of a male link and at least one aperture, one of said arms of each end of said female links including an enlarged boss portion extending laterally away from said gaps a farther distance than the lateral extension of said other arm, whereby a greater pivot pin bearing area is provided, said central segment having a generally I-shaped cross section including a pair of relatively broad flange portions adapted to slide along wear rails during use; and a plurality of pivot pins, one of said pivot pins being inserted into said apertures of each said male and female link to be pivotally coupled together.

7. A chain comprising:

a plurality of male and female links interconnected together in an alternating manner;

said female links each having a body and a pair of ends, said body including a pair of relatively broad wear flanges and a relatively narrow web interconnecting said flanges, each said flange including a broad outer wear surface to engage wear rails during use each said broad outer wear surface increasing the engaging surface between said broad outer wear surface and the wear rail upon which said wear surface is used such that the wear life of the chain is increased, and each said end having a pair of bifurcated arms defining a gap therebetween;

said male links each having a medial segment and a pair of ends, said medial segment having a narrower configuration than said bodies and ends of said female links to enable a sprocket to engage the chain for movement of the chain along a defined path, each said end of said male links being matingly received in one of said gaps of one said female link; and means for pivotally coupling said female and male links together.

8. A chain in accordance with claim 7 wherein each said end of said male link defines an aperture therein and each of said arms of each said female link defines an aperture therein, and wherein each said aperture in said male links is aligned with said apertures in a pair of said arms defining one of said gaps to receive said pivot means therethrough.

9. A chain in accordance with claim 8 wherein one of said arms includes a stop adapted to engage and prevent rotation of said pivot means and the other of said arms includes an enlarged boss portion.

10. A chain in accordance with claim 7 wherein said arms are formed asymmetrically.

11. A chain comprising:

at least one first link having at least one end, said end defining an aperture therein;

at least one second link having a body and at least one end, said body including a pair of relatively broad flanges and a relatively narrow web interconnecting said flanges, said end having a pair of bifurcated arms defining a gap therebetween, and said gap matingly receiving said end of said first link therein, each of said arms defining an aperture therein, said apertures in said arms being aligned with said aperture in said first link, said aperture in said one arm being shorter than said aperture in said other arm, one of said arms further including a stop and the other of said arms including an enlarged boss portion; and means received through said aligned apertures for pivotally coupling said first and second links together, said means engaging said stop of said second link to prevent rotation of said means.

12. A chain comprising:

at least one first link having at least one end, said end of said first link defining an aperture therein;

at least one second link having a body and at least one end, said body including a pair of relatively broad flanges and a relatively narrow web interconnecting said flanges, said end having a pair of bifurcated arms defining a gap therebetween, and said gap matingly receiving said end of said first link therein, said arms of said second link each defining an aperture therein, said aperture in one of said arms being longer than said aperture in the other of said arms; and means received through said aligned apertures for pivotally coupling said first and second links together.

13. A chain comprising:

at least one first link having at least one end, said end defining an aperture therein;

at least one second link having at least one end defining a pair of bifurcated arms, said bifurcated arms being formed asymmetrically and defining a gap therebetween for receiving said end of said first link; said arms each defining an aperture therein, said aperture in one of said arms being longer than said aperture in the other of said arms; and means received through said apertures in said first and second links for pivotally coupling said end of said first link to said arms of said second link.

14. A chain in accordance with claim 13 wherein said one arm defines an enlarged boss and said other arm defines a stop which engages and prevents said pivot means from turning.

15. A chain link comprising a body segment and a pair of ends, said body segment being defined along a longitudinal axis and including a pair of spaced apart relatively broad transverse wear flanges and a relatively narrow web interconnecting said flanges, each said flange including an outer wear surface for engaging a wear rail during use said outer wear surface increasing the engaging surface between said broad outer wear surface and the wear rail upon which said wear surface is used such that the wear surface of the chain link is increased, said ends each including a pair of bifurcated arms defining a gap therebetween, each said gap extending along said longitudinal axis and opening outwardly, and each said arm defining a transverse hole therethrough adapted to receive a pin for pivotally coupling the chain link to another complimentary link.

16. A chain link in accordance with claim 15 in which said arms are formed asymmetrically.

17. A chain link comprising a body segment and a pair of ends, said body segment including a pair of spaced apart relatively broad flanges and a relatively narrow web interconnecting said flanges, said ends each including a pair of bifurcated arms defining a gap therebetween, and each said arm defining a transverse aperture therethrough adapted to receive a pin for pivotally coupling the chain link to another complimentary link, in one of said arms being longer than said aperture in the other of said arms.

18. A chain link in accordance with claim 17 wherein said one arm includes an enlarged boss section and said other arm includes at least one stop adapted to engage and prevent a pivot pin from turning.

19. A chain link comprising a central body segment and pair of ends, said ends each including a pair of asymmetrical bifurcated arms defining a gap therebetween adapted to receive a complimentary link therein, and each said arm defining a transverse aperture therethrough adapted to receive a pin for pivotally coupling the chain link to the complimentary link, the aperture defined in said one arm being longer than the aperture defined in said other arm, one of said arms including an enlarged boss section having a substantially continuous annular outer surface and the other of said arms including at least one stop adapted to engage and prevent the pivot pin from turning.

20. A chain link in accordance with claim 19 in which said body segment has a generally T-shaped configuration.

* * * * *